United States Patent [19]

Gresens

[11] Patent Number: 5,005,271
[45] Date of Patent: Apr. 9, 1991

[54] CONVEYOR CHAIN FOR MACHINES FOR TENSIONING LENGTHS OF MATERIAL

[75] Inventor: Harry Gresens, Benningen/Neckar, Fed. Rep. of Germany

[73] Assignee: Bruckner Trockentechnick GmbH & Co. KG, Fed. Rep. of Germany

[21] Appl. No.: 423,490

[22] Filed: Oct. 12, 1989

Related U.S. Application Data

[63] Continuation of Ser. No. 165,236, Mar. 7, 1988, abandoned.

[30] Foreign Application Priority Data

Apr. 16, 1987 [DE] Fed. Rep. of Germany ....... 3713063

[51] Int. Cl.⁵ .............................................. D06C 3/02
[52] U.S. Cl. .......................................... 26/89; 26/95; 384/461
[58] Field of Search ............... 198/838, 845, 841, 500; 26/89, 93, 95; 384/461, 474, 475

[56] References Cited

U.S. PATENT DOCUMENTS

| | | | |
|---|---|---|---|
| 2,945,280 | 7/1960 | Liebert | 26/95 |
| 3,638,289 | 2/1972 | Dornier et al. | 26/93 |
| 4,158,252 | 6/1979 | Broome | 26/93 |
| 4,602,407 | 7/1986 | Gresens | 384/461 X |
| 4,706,348 | 11/1987 | Gresens | 26/93 |

FOREIGN PATENT DOCUMENTS

| | | | |
|---|---|---|---|
| 0138117 | 4/1985 | European Pat. Off. | 26/93 |
| 3333938 | 4/1985 | Fed. Rep. of Germany | 26/93 |
| 3513087 | 10/1986 | Fed. Rep. of Germany | 26/89 |
| 1124776 | 10/1956 | France | 26/95 |
| 8701147 | 2/1987 | PCT Int'l Appl. | 26/89 |
| 2176509 | 12/1986 | United Kingdom | 26/95 |

Primary Examiner—D. Glenn Dayoan
Attorney, Agent, or Firm—Learman & McCulloch

[57] ABSTRACT

The invention relates to a conveyor chain for machines for tensioning lengths of material, with pairs of outer fishplates and pairs of inner fishplates flexibly connected by chain joint bolts and with support members for grippers or needle plates. The pairs of inner fishplates are supported by means of joint sleeves on the chain joint bolts, needle bearings are arranged between the joint sleeves and the chain joint bolts and ball bearings are provided on the outer peripheral surfaces of these chain joint bolts. These ball bearings are constructed like roller bearings with particularly thick outer races, and the outermost outer fishplates rest with a bore clearance on the chain joint bolts. This conveyor chain is distinguished by a simple and stable construction which requires little maintenance.

6 Claims, 2 Drawing Sheets

CONVEYOR CHAIN FOR MACHINES FOR TENSIONING LENGTHS OF MATERIAL

This is a continuation of co-pending application Ser. No. 07/165,236 filed on Mar. 7, 1988 now abandoned.

BACKGROUND OF THE INVENTION

The invention relates to a conveyor chain for machines for tensioning lengths of material according to the preamble to claim 1.

Lengths or webs of plastic and textile material are principally passed through tensioning machines whilst being guided widthways for the purpose of processing (e.g. drying and/or fixing and cooling), during which these transport chains grip the lengths of material to be processed on their long edges by means of grippers or needle plates. Depending upon the type of material and the processing to which it is to be subjected it is generally known in the art to use two different types of conveyor chain, namely on the one hand so-called sliding chains which are preferably used at high material speeds and high temperatures (with only limited requirements for maintenance and lubrication) and on the other hand so-called rolling chains which are preferred for particularly high transverse tensional forces in the lengths of material (e.g. in industrial fabrics or the like) and at their joints have ball bearings on the outer races of which they are supported so as to be able to roll on longitudinal guide rails of a chain guide and as a result can take up high transverse tensional forces very well. The present invention relates to the last-mentioned construction.

Conveyor chains of the last-mentioned construction are sufficiently known in the art. Whilst in these the ball bearings are mounted on the outer peripheral surface of the joint sleeves, the inner peripheral surfaces of these joint sleeves can be articulated on the appertaining chain joint bolts by means of sliding bearing sleeves. Sliding bearing sleeves inside the joint sleeves together with the chain joint bolts form the actual chain joints. Whilst the ball bearings mounted on the outer peripheral surfaces of the joint sleeves serve both for the rolling support (to accommodate high transverse tensional forces in the length of material) and also for the chain turn-round. In practice these conveyor chains in the form of rolling chains have proved to have some shortcomings: For reasons of cost the conveyor chains which are used should be produced with normal manufacturing precision. As a result the chain joint bolts generally deviate from their desired normal position by a few minutes of a degree, resulting in an undesirable end pressure in the sliding bearing sleeves of these chain joints which leads to premature wear. In addition, the ball bearings which are usually used have outer races which have a relatively high elasticity. The transverse tensional forces of lengths of material to be processed lead to punctiform loads on the outer races of the ball bearings, as a result of which during operation they are slightly deformed upon introduction of force to an approximately oval shape, which is also undesirable.

These disadvantages of the known construction can only be avoided in part by another equally known conveyor chain in which needle bearings can be used in place of sliding bearing sleeves.

OBJECT OF THE INVENTION

The object of the invention is to eliminate the shortcomings described above and to improve the known constructions of a conveyor chain of the type described above in such a way that it has a relatively simple construction which requires little maintenance and is therefore easy to maintain, is particularly stable and wear-resistant and operates extremely reliably.

This object is achieved according to the invention by the combination with the features described hereinbelow.

In the tests on which the invention is based, it has been shown that even ball bearings with normally reinforced outer races are still subject to undesirably great deformation. It may be though that additional reinforcing rings could be provided on the outer races of the ball bearings: however, this involves an undesirable increase in the manufacturing costs. By contrast, in the construction according to the invention ball bearings are provided which are guided like a roller bearing with a particularly thick outer race. In the tests on which the invention is based, it was possible to establish that such outer ball races have sufficient deformation stability at transverse tensional forces of the magnitude to be expected in the lengths of material. These ball bearings used according to the invention have markedly greater external diameters by comparison with normal ball bearings (for example the external diameter of outer races of comparable conventional ball bearings can be approximately 40 mm, whereas by contrast the external diameter of the outer races of the ball bearings used according to the invention can be approximately 47 mm), and therefore a further advantage can be achieved by the construction according to the invention in that the number of revolutions of the ball bearing given the same chain speed is reduced by comparison with the previously known chains.

As regards a construction offering ease of maintenance, the inventive feature described below has proved particularly advantageous. In this case, the outermost outer fishplates rest on the appertaining chain joint bolts with a small bore clearance. Therefore, the conveyor chain can be taken apart quickly in any or all regions in the desired manner, during which after unscrewing the corresponding support members the larger outer fishplates located underneath are lifted free and afterwards the individual inner fishplate members, which consist in each case of a pair of inner fishplates, two joint sleeves arranged a certain distance apart and two ball bearings arranged thereon, are also lifted off. In this way, on the one hand the needle bearings mounted on the chain joint bolts are completely freely accessible (they can be washed out and if required can be relubricated), and on the other hand the said inner fishplate members and in particular the appertaining ball bearings can also be cleaned and, if required, relubricated.

In one embodiment of the conveyor chain, each chain joint bolt has in the region of the ball bearing at least one radial first lubrication bore and one axial second lubrication bore which starts from the free end of the chain joint bolt extension and extends at least into the region of the radial lubrication bore.

In the known conveyor chain constructions it is usual for the upper free opening end of the axial lubrication bore, i.e. the end at which the lubricant enters, of each chain joint bolt to be closed by a high-pressure grease nipple, and this axial lubrication bore is filled with lubricant. To fill all the chain joint bolts of a conveyor chain with lubricant not only represents considerable additional costs but also such fillings are subject to considerable temperature-induced wear during operation and because of the high ambient temperatures the oils in these lubricants vaporise so that hard residues which no longer have any lubricating power remain in the axial lubrication bores. By means of the further construction according to the invention as explained above in the region of the chain joint bolt (and in the region of its lubrication bores) the disadvantages just mentioned of the known constructions can be reliably avoided. In this construction according to the invention, screws which in each case fill the axial lubrication bores are used in the chain joint bolts instead of the high-pressure grease nipples which are usual in the known conveyor chains. As a result the axial lubrication bores of the chain joint bolts no longer need to be filled with lubricant. For further lubrication of these joints (with the needle bearings and ball bearings) it is then only necessary to remove the screws whereupon fresh lubricant can then be introduced as far as the radial lubrication bores by means of further lubrication devices; in this case the lubricant only needs to be dispensed to the lubrication points in the region of the radial lubrication bores.

Further advantageous embodiments of the invention are the subject matter of the other dependent claims.

BRIEF DESCRIPTION OF THE DRAWINGS

The invention will be explained in greater detail with the aid of the drawings, in which.

DETAILED DESCRIPTION OF THE PREFERRED EMBODIMENT

Figure 1:
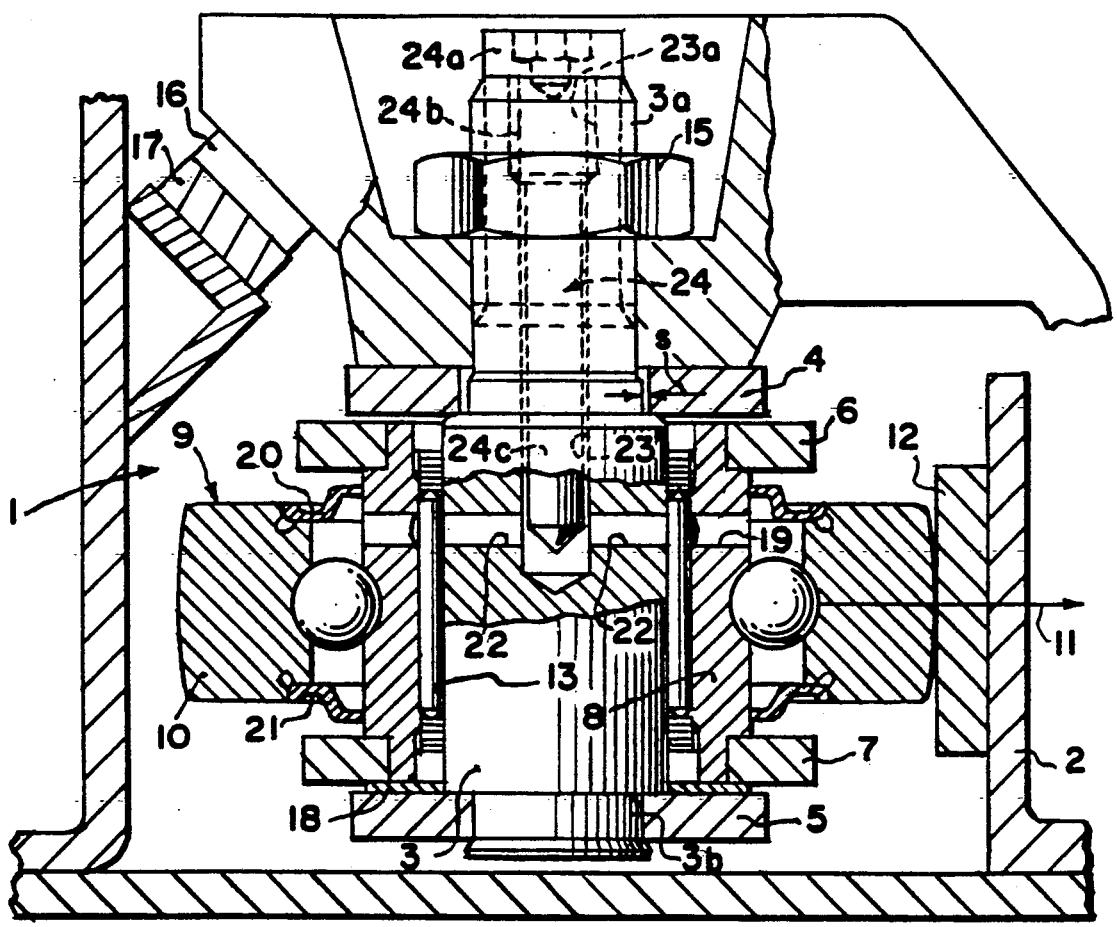
FIG. 1 shows a cross-section through the conveyor chain according to the invention in the region of a joint and inside an appertaining chain guide.
Figure 1A:
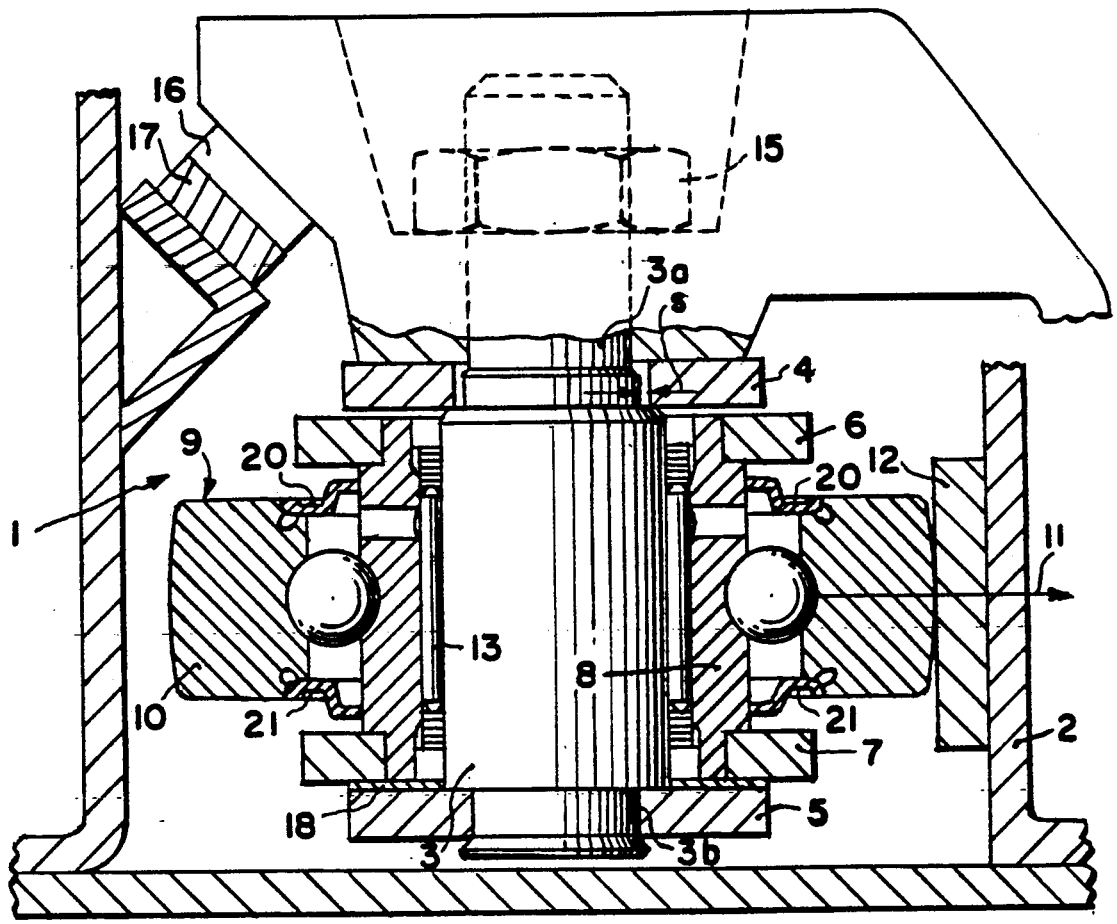
FIG. 1A shows a cross-section of a second conveyor chain according to the invention in the region of a joint and inside an appertaining chain guide.

For the sake of simplicity the conveyor chain 1 according to the invention is shown in FIG. 1 only in cross-section in the region of joint. It should be assumed that this conveyor chain 1 runs continuously round in a horizontal plane, moving at right angles to the drawing plane of FIG. 1.

The conveyor chain 1 is guided in a chain guide 2 in the longitudinal direction through a machine for tensioning lengths or webs of material which is known per se, the chain guide 2 being a part of the tensioning machine.

The conveyor chain 1 contains outer fish plates 4, 5 arranged in pairs on chain bolts 3 and also inner fish plates 6, 7 which are also assembled in pairs. Each pair of inner fish plates 6, 7 is firmly connected at each of their respective two ends to a joint sleeve 8 which, in turn, is supported on one of the chain joint bolts 3. A ball bearing roller 9, the inner race of which forms the appertaining joint sleeve 8, is mounted on the outer peripheral surface of each joint sleeve 8. Each ball bearing roller 9 is constructed like a roller bearing with a particularly thick outer race or rim 10, i.e. this outer race 10 has a particularly great radial thickness by contrast with a comparable normal ball bearing and thus has a relatively large external diameter. In this way the outer race 10 of the ball bearing has a comparatively high inherent stability, even in the case of relatively high radial transverse tensional forces, which are indicated in FIG. 1 by the arrow 11 and during operation of the appertaining tensioning machine emanate from a length of material to be processed when the conveyor chain 1 is supported in a rolling manner by means of the ball bearings 9 and the outer races 10 thereof bearing on a longitudinal guide rail 12 of the chain guide 2 located on the side of the length of material—which is not shown.

In the illustrated embodiment a needle bearing 13 which is fixed directly on the outer peripheral surface of the chain joint bolt 3 is provided between the joint sleeve 8 and the chain joint bolt 3 in the region of each chain joint (FIG. 1). If necessary, i.e. in particular in the case of larger chain constructions, two sets of such needle bearings can of course also be arranged axially with respect to one another on the chain joint bolt 3 as taught in U.S. Pat. No. 4,602,407.

The chain joint bolts 3 have at one end a bolt extension 3a which projects outwards and upwards over the upper, outermost outer fishplate 4 of the appertaining pair of outer fishplates and is provided with an external thread. These bolt extensions 3a serve to receive conventional support members 14 for web tensioning grippers or needle plates to grip the long edges of lengths of material to be processed. These support members 14 are arranged on the upper, outermost fishplates 4 of the corresponding pairs of outer fishplates (4, 5) and fixed so as to be releasable with the aid of a nut 15 which is screwed onto the bolt extension 3a. Furthermore, the support members 14 can have at least on their rear surface facing away from the length of material a slide or guide element 16 bearing on a sliding guide rail 17 of the chain guide 2.

In the present embodiment of the conveyor chain 1 each of the outermost outer fishplates 4 on which the support members 14 are arranged has an aperture through which the joint bolt 3 extends. The aperture is sufficiently larger in size than the bolt to provide an unoccupied annular space s encircling the bolt. On the other hand, each of the opposing innermost outer fishplates 5 of each pair of outer fishplates is firmly connected to the inner end 3b of the appertaining chain joint bolt 3 (for example by press fit). A thin foil bearing 18 can also be provided in a manner which is known per se between the innermost outer fishplates 5 and the lower ends of the joint sleeves 8 or the inner fishplates 7 located there.

In the illustrated embodiment the joint sleeves 8 which form the inner races of the ball bearings 9 have two approximately diametrically opposed radial transverse bores (through bores) 19 which—as can be seen in FIG. 1—open at a distance above and adjacent to the ball race. These transverse bores 19 serve to introduce a permanent lubricant into the region of the ball race of these ball bearings 9 and to the needle bearings 13.

The two axial ends of the ball bearings 9 are sealed by suitable ring seals 20 and 21 so as to be lubricanttight.

In the region of the ball bearing each chain joint bolt 3 has at least one—in the case of FIG. 1. two—radial first lubrication bore 22, and these first radial lubrication bores 22 are positioned at the same height as the transverse bores 19 of each joint sleeve 8. In addition, each chain joint bolt 3 has an axial second lubrication bore 23 which starts from the free end of its extension 3a and extends at least as far as the regions of the radial lubrication bores 22. This axial second lubrication bore 23 has a relatively short internal thread 23a only in the region of its free opening end—the upper end in FIG. 1. A screw (filler screw) 24 which has an external thread 24b adapted to the internal thread 23a only in the proximity of its head 24a which is supported on the free front end of the chain joint bolt 3 is screwed into his internal thread 23a. This screw 24 also has a substantially cylindrical shank 24c which adjoins the external thread 24b and extends with its free end approximately as far as the radial first lubrication bores 22 (cf. FIG. 1), and the external diameter of this screw shank 24c is adapted approximately in the form of a sliding fit to the internal diameter of the other cylindrical section of the axial lubrication bore 23. Thus when it is screwed in (FIG. 1) the screw 24 fills the axial second lubrication bore 23 as far as the region of the radial first lubrication bores 22. The head 24a of the screw 24 can be constructed in a suitable manner, for example with an external hexagon or—as shown in FIG. 1—an internal hexagon.

If in this embodiment the ball bearings 9 and the needle bearings 13 need to be further lubricated, then it is merely necessary for the filler screw 24 to be unscrewed, whereupon the lubricating pipe of a suitable further lubrication device can be introduced into the axial second lubrication bore 23 approximately as far as the region of the radial first lubrication bores 22. After the further lubrication the filler screws 24 are screwed in again so that no lubricant remains in the axial second lubrication bores 23, resulting in an extremely economic and advantageous lubrication of the ball bearings 9 and the needle bearings 13.

As an alternative, however, the chain joint bolts 3 of the conveyor chain 1 can also be constructed without lubrication bores, that is to say in contrast to the construction described above they do not have any axial or radial lubrication bores. In this case the ball bearings 9 and the needle bearings 13 can then be provided with permanent grease lubrication or appropriate grease stocks which can then simply be renewed from time to time when maintenance is required.

In this alternative construction of the chain joint bolts, the ball bearings 9 and the needle bearings 13 are provided during the maintenance work (after cleaning of the bearings) with sufficient accurately measured lubrication stocks which can be introduced into the bearing by the appropriate further lubrication devices. The advantages of this alternative construction lie in the simplified production of the chain joint bolts.

Figure 2:
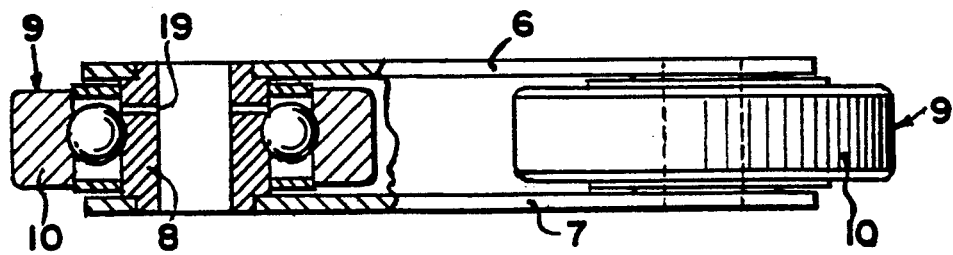
FIG. 2 shows a partially cut-away side view of an inner fishplate member.

With regard to the overall construction of the conveyor chain 1 it should also be mentioned that this chain contains a plurality of inner fishplate members which are constructed as individual units, each consisting essentially of a pair of inner fishplates (6, 7), two joint sleeves 8 arranged a distance apart and two ball bearings 9 arranged thereon, as illustrated in FIG. 2 on the basis of an inner fishplate member. In each case two adjacent inner fishplate members arranged spaced from one another in accordance with FIG. 2 are connected to one another at their ends which point to one another by a pair of outer fishplates (4, 5) which engage over them and two chain joint bolts 3, so that the assembly shown in section in FIG. 1 is produced at each joint.

When this conveyor chain 1 has to be dismantled for maintenance purposes, first of all the screw nuts 15 are undone so that the support members 14 can be taken off (the heads 24a of the screws 24 which are screwed in do not hinder this operation). Afterwards the removal of upper, outermost outer fishplates 4 is facilitated because their bore clearances enable them easily to be lifted up from the chain joint bolts 3. In this way the inner fishplate members described above are released (FIG. 2), so that they can also be lifted up from the chain joint bolts 3, the needle bearings 13 located thereon and the innermost outer fishplates 5 lying underneath. The needle bearings 13 are now completely free so that they can be washed and regreased. Independently of this the said inner fishplate members including their two ball bearings 9 can be cleaned for example in an ultrasonic washing machine and thereby freed from old grease residues. Then, or after reassembly, the cleaned ball bearings can also be refilled with permanent lubricant.

In this construction according to the invention the maintenance shut-down periods for the conveyor chains of a machine for tensioning lengths of material can be reduced still further if replacement inner fishplate members are available which can be easily installed in the manner described above whenever maintenance is necessary on the tensioning machine or the conveyor chains. The inner fishplate members which are removed can then be cleaned and prepared for reinstallation in the conveyor chain at a time when the tensioning machine is already operating again.

I claim:

1. A conveyor chain joint construction for a web tensioning machine, said construction comprising a joint bolt having an axis; a joint sleeve; first bearing means journalling said joint sleeve on said joint bolt for rotation about said axis; a first pair of fishplates respectively mounted on said joint sleeve at opposite ends thereof; a roller; second bearing means journalling said roller on said joint sleeve between the fishplates of said first pair thereof and for rotation about said axis; a second pair of fishplates respectively mounted on said joint bolt adjacent opposite ends of said joint sleeve and straddling said first pair of fishplates; a support member for supporting web tensioning means; and means removably mounting said support member on said joint bolt in such position that one fishplate of said second pair thereof is sandwiched between said support member and said joint sleeve, said one fishplate having an aperture therein through which said joint bolt extends, said aperture being sufficiently larger in size than said joint bolt as to provide an unoccupied annular space encircling said joint bolt, thereby facilitating removal of said one fishplate to provide access to said first and second bearing means.

2. The construction set forth in claim 1 wherein said joint bolt has an axial lubrication bore and a radial lubrication bore in communication with one another, said radial bore also being in communication with said first bearing means, said joint sleeve having a radial lubrication bore in communication with said first bearing means and with said second bearing means.

3. The construction according to claim 1 wherein said joint sleeve has a radial lubrication bore in communication with said first bearing means and said second bearing means.

4. The construction according to claim 1 wherein said roller has a radially thick external rim.

5. The construction according to claim 1 wherein said machine has a pair of spaced guide rails between which said chain joint construction is accommodated, said support member having a guide bearing on one of said rails, and said roller bearing on the other of said rails.

6. In a web tensioning machine having a pair of parallel, spaced apart guide rails between which a multiple-link tensioning chain is accommodated, and a plurality of support members carried by said chain at spaced intervals and supporting web tensioning means, each of said support members having a guide bearing against one of said rails, the improvement wherein each of said links has a joint comprising a joint bolt having an axis; a joint sleeve; first bearing means journalling said joint sleeve on said joint bolt for rotation about said axis; a first pair of fishplates respectively mounted on said joint sleeve at opposite ends thereof; a roller; second bearing means journalling said roller on said joint sleeve between the fishplates of said first pair thereof and for rotation about said axis in a position to bear against one of said rails; a second pair of fishplates respectively mounted on said joint bolt adjacent opposite ends of said joint sleeve and straddling said first pair of fishplates, each of said support members having means for supporting web tensioning means; means removably mounting each of said support members on one of said joint bolts in such position that one fishplate of said second pair thereof is sandwiched between said support member and said joint sleeve; and guide means carried by each of said support members in a position to bear against the other of said rails, said one of said fishplates having an aperture therein through which said joint bolt extends, said aperture being sufficiently larger in size than said joint bolt as to provide an unoccupied annular space encircling said joint bolt, thereby facilitating removal of said one fishplate to provide access to said first and second bearing means.

* * * * *